United States Patent
Hsu et al.

(10) Patent No.: US 8,831,696 B2
(45) Date of Patent: Sep. 9, 2014

(54) SLIDE-AID DEVICE FOR ELECTRONIC APPARATUS

(75) Inventors: An Szu Hsu, New Taipei (TW); Chien Cheng Mai, New Taipei (TW); Way Han Dai, New Taipei (TW)

(73) Assignee: First Dome Corporation, New Taipei (TW)

( * ) Notice: Subject to any disclaimer, the term of this patent is extended or adjusted under 35 U.S.C. 154(b) by 300 days.

(21) Appl. No.: 13/337,564

(22) Filed: Dec. 27, 2011

(65) Prior Publication Data

US 2013/0160241 A1 Jun. 27, 2013

(51) Int. Cl.
*H04M 1/00* (2006.01)
(52) U.S. Cl.
USPC ...................................... 455/575.4
(58) Field of Classification Search
USPC ............................ 74/100.1; 455/575.1, 575.4
See application file for complete search history.

(56) References Cited

U.S. PATENT DOCUMENTS

| | | | | |
|---|---|---|---|---|
| 7,102,881 B2* | 9/2006 | Park et al. | ................ | 361/679.08 |
| 7,450,979 B2* | 11/2008 | Seo | ............................ | 455/575.4 |
| 7,779,509 B2* | 8/2010 | Jian | ................................. | 16/359 |
| 7,783,331 B2* | 8/2010 | Chung et al. | ................ | 455/575.1 |
| 8,165,284 B2* | 4/2012 | Jang et al. | ................ | 379/433.12 |
| 8,265,721 B2* | 9/2012 | Amano | ........................ | 455/575.4 |
| 2004/0085739 A1* | 5/2004 | Lee et al. | ........................ | 361/727 |
| 2009/0049646 A1* | 2/2009 | Rubin et al. | .................... | 16/319 |

\* cited by examiner

*Primary Examiner* — Justin Krause
(74) *Attorney, Agent, or Firm* — Rosenberg, Klein & Lee (57) ABSTRACT

A slide-aid device for electronic apparatus includes a linkage mechanism and an elastic unit assembled with the linkage mechanism. The linkage mechanism has a first arm and a second arm pivotally connected with the first arm. The elastic unit has a fixed end and a connection end. The connection end is pivotally connected with the second arm, whereby the elastic unit is movable with the second arm. When an operation force is applied to the first arm, the first arm is moved to drive the second arm so as to make the elastic unit store energy. After the first arm passes over a reference axis, the elastic unit releases the energy to provide an action force to help the operation force.

10 Claims, 7 Drawing Sheets

SLIDE-AID DEVICE FOR ELECTRONIC APPARATUS

BACKGROUND OF THE INVENTION

1. Field of the Invention

The present invention relates generally to a slide-aid device for electronic apparatus, and more particularly to a slide-aid device including a linkage mechanism and an elastic unit respectively assembled with a slide module and an apparatus body of the electronic apparatus. By means of the slide-aid device, a user can more easily operate the slide module to move through a long travel.

2. Description of the Related Art

It is known that various freely reciprocally movable or slidable screen/slide cover systems have been developed and applied to different electronic devices such as mobile phones, laptops, PDA, digital imagers and electronic books. The slide cover can be moved and opened/closed.

The above screen/slide cover module or slide cover assembly generally includes a movable frame, a linking board, multiple elastic members, linking wires and guide rails with specific configurations. These components cooperate with each other to help in opening/closing the slide cover. When such slide cover module is applied to a relatively heavyweight electronic product necessitating longer movement distance, (for example, a laptop necessitating over 120 mm slide travel), at the initial stage, an operator needs to exert a greater force to push the slide cover module for a longer time.

This is because the operator must at least push the slide cover module through one half of the travel (about 60 mm) under the elastic restoring resistance of the elastic members. Thereafter, at the later half stage of the travel, the elastic members will release energy to save the strength of the operator. This makes it difficult for a user to operate the slide cover, especially for a female, a child or an oldster.

It is therefore tried by the applicant to provide a slide-aid device for electronic apparatus to overcome the above shortcoming existing in the conventional screen/slide cover module. By means of the slide-aid device, in case of a relatively heavyweight electronic product necessitating longer movement distance, an operator only needs to push the slide cover module by a shorter distance to make the slide cover module start to automatically move to the end of the travel. In comparison with the conventional slide cover module, at the initial stage of the travel, the strength of an operator for pushing the slide cover module can be saved.

SUMMARY OF THE INVENTION

It is therefore a primary object of the present invention to provide a slide-aid device for electronic apparatus. The slide-aid device includes a linkage mechanism and an elastic unit assembled with the linkage mechanism. The linkage mechanism has a first arm and a second arm pivotally connected with the first arm. The elastic unit has a fixed end and a connection end. The connection end is pivotally connected with the second arm, whereby the elastic unit is movable with the second arm. When an operation force is applied to the first arm, the first arm is moved to drive the second arm so as to make the elastic unit store energy. After the first arm passes over a reference axis, the elastic unit releases the energy to provide an action force to help the operation force. Accordingly, a user can more easily operate a slide module such as a slide cover or a screen to move through a long travel.

It is a further object of the present invention to provide the above slide-aid device for electronic apparatus in which each of the first and second arms has a first end and a second end. The first end of the first arm is affixed to or pivotally connected to a carrier of a slide module. The second end of the first arm is connected with the second end of the second arm. The first end of the second arm is affixed to or pivotally connected to a substrate of a fixed apparatus body. The fixed end of the elastic unit is pivotally connected to the substrate of the fixed apparatus body. The connection end of the elastic unit is pivotally connected with the second arm between the first and second ends thereof. When a user operates the slide module to move from a closed position (first position) to an opened position (second position), the first arm drives the second arm to move, whereby the elastic unit stores energy. After the first arm passes over the reference axis, the elastic unit releases the energy to provide an action force to help in moving the slide module toward the second position.

The present invention can be best understood through the following description and accompanying drawings, wherein:

DETAILED DESCRIPTION OF THE PREFERRED EMBODIMENTS

Figure 1:
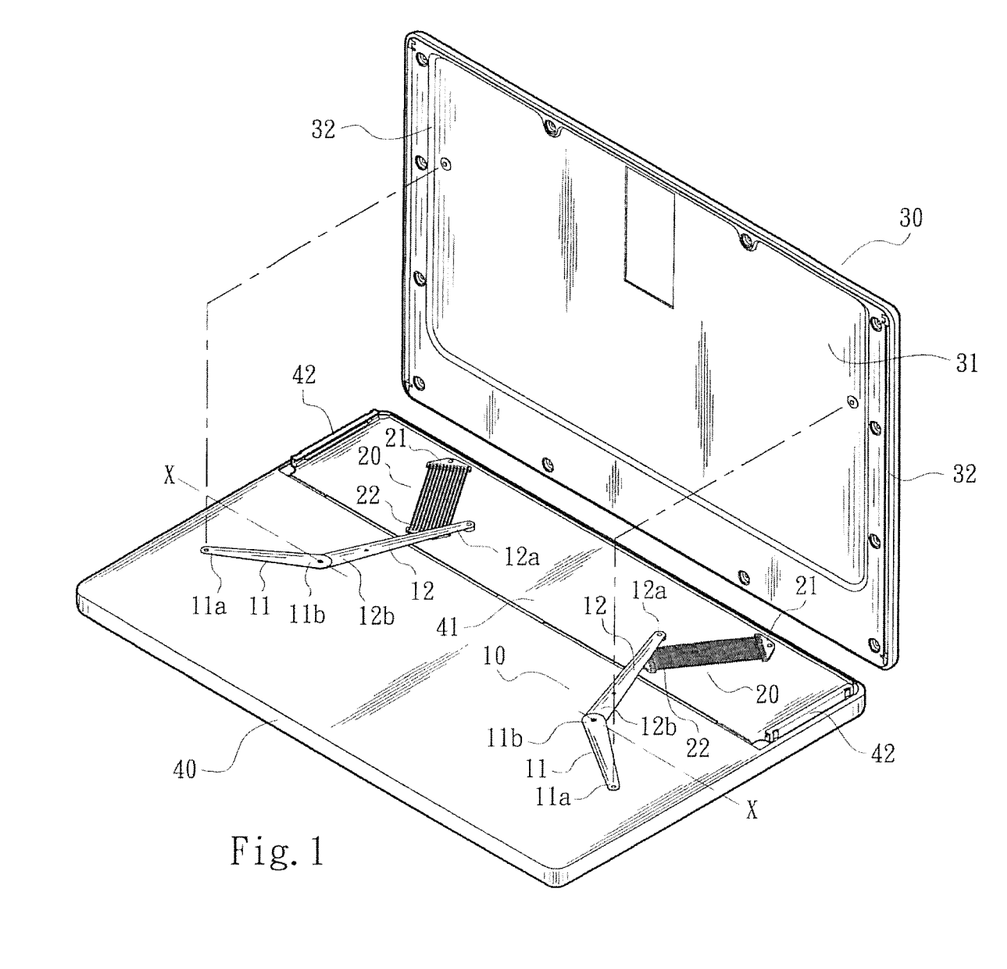
FIG. 1 is a perspective assembled view of the present invention, showing that two linkage mechanisms and two elastic units are symmetrically arranged on two sides of the slide module and two sides of the fixed apparatus body respectively.
Figure 2:
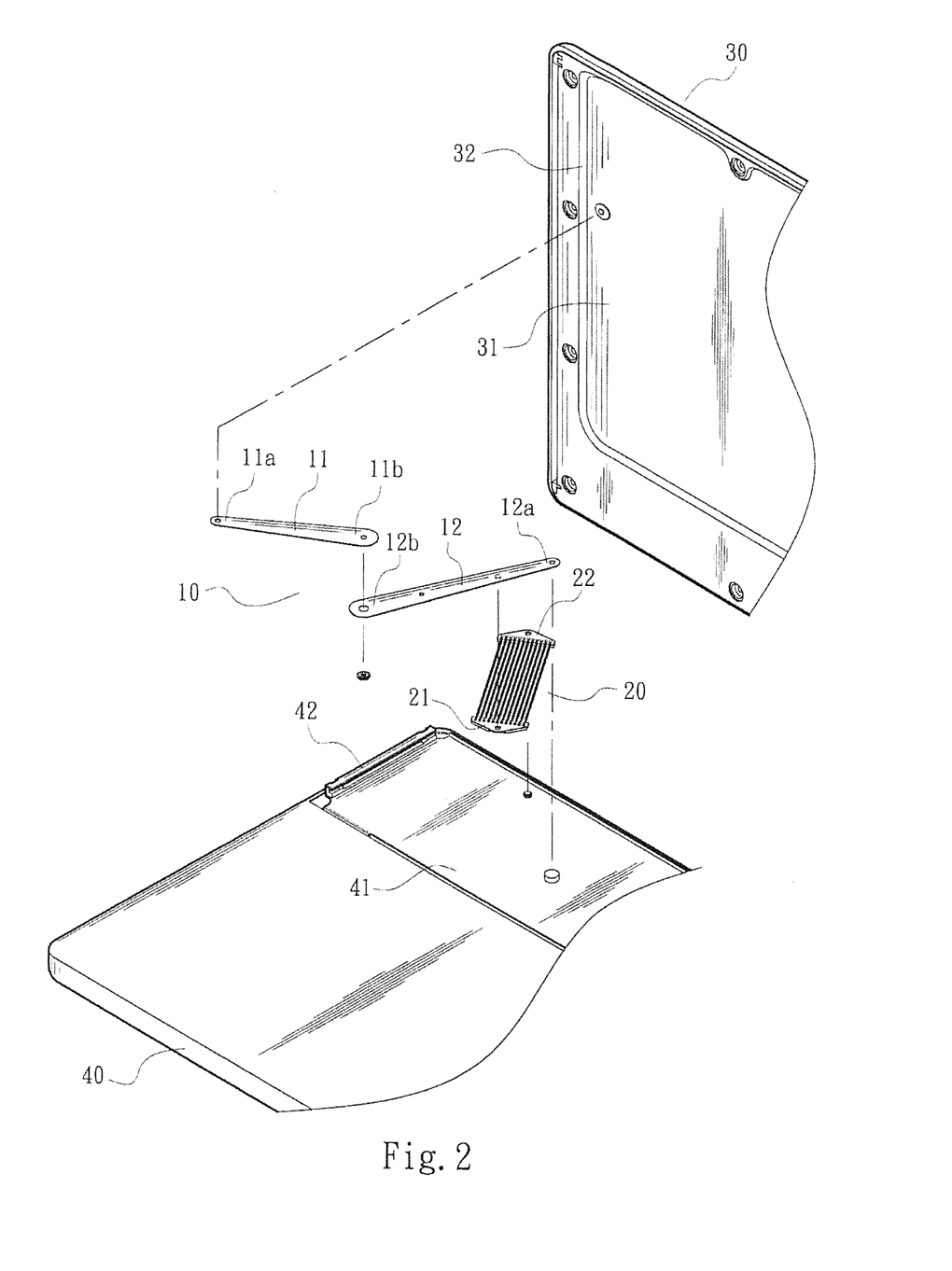
FIG. 2 is a perspective partially exploded view according to FIG. 1, showing the linkage mechanism and the elastic unit of the present invention.

Please refer to FIGS. 1 and 2. The slide-aid device for electronic apparatus of the present invention includes a linkage mechanism 10 and an elastic unit 20. The linkage mechanism 10 has a first arm 11 and a second arm 12 pivotally connected with the first arm 11. The elastic unit 20 is mounted on the second arm 12.

In a preferred embodiment, each of the first and second arms 11, 12 has a first end 11a, 12a and a second end 11b, 12b. The first end 11a of the first arm 11 is affixed to or pivotally connected to a carrier 31 of a slide module 30 (such as a screen or a slide cover). The second end 11b of the first arm 11 is connected with the second end 12b of the second arm 12. The first end 12a of the second arm 12 is affixed to or pivotally connected to a substrate 41 of a fixed apparatus body 40.

As shown in the drawings, the slide module 30 and the fixed apparatus body 40 are respectively provided with two cooperative rails 32, 42. Accordingly, the slide module 30 can be freely moved on the fixed apparatus body 40.

Referring to FIGS. 1 and 2, the elastic unit 20 has the form of an extension spring. The elastic unit 20 has a fixed end 21 and a connection end 22 pivotally connected with the second arm 12 and movable along with the second arm 12. As shown in the drawings, the fixed end 21 of the elastic unit 20 is pivotally connected to the substrate 41 of the fixed apparatus body 40. The connection end 22 of the elastic unit 20 is connected with the second arm 12 between the first and second ends 12a, 12b thereof. To speak more specifically, the connection end 22 of the elastic unit 20 is pivotally connected with the second arm 12 in a position close to the first end 12a of the second arm 12.

In a preferred embodiment, the slide-aid device is defined with a reference axis χ. The direction in which the slide module 30 is moved from a closed position (first position) to an opened position (second position) is defined as a perpendicular direction. In this case, the reference axis χ is a horizontal reference axis relative to the perpendicular direction. Substantially, the reference axis χ is a horizontally extending reference line with the second end 11b of the first arm 11 or the second end 12b of the second arm 12 serving as a reference point.

Accordingly, when a user operates the slide module 30 to move from the closed position (first position) to the opened position (second position), the first arm 11 drives the second arm 12 to move, whereby the elastic unit 20 stores energy. After the first arm 11 passes over the reference axis χ, the elastic unit 20 releases the energy to provide an action force to help in moving the slide module 30 toward the second position.

Figure 3:
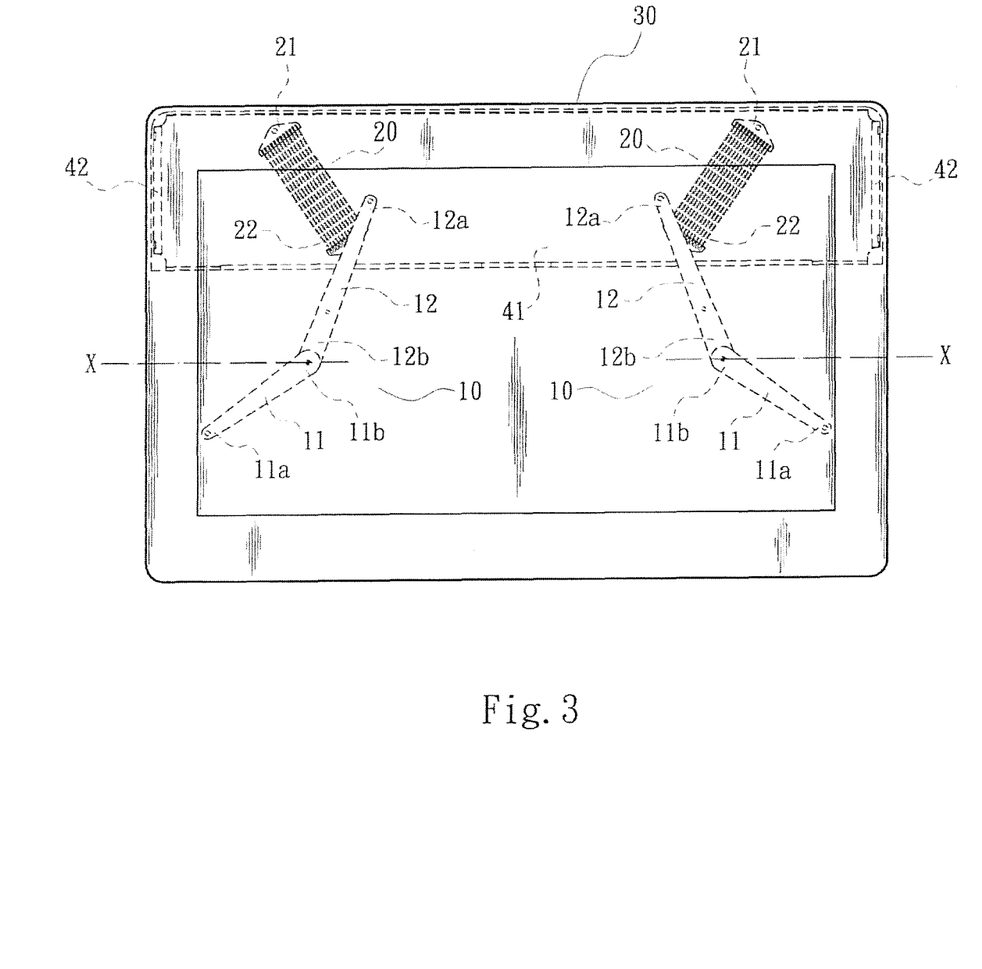
FIG. 3 is a plane view according to FIG. 1, showing that the linkage mechanism is positioned in the initial position, that is, the slide module is positioned in the closed position.

Please refer to FIG. 3, which shows that the linkage mechanism 10 is positioned in an initial position, (that is, the slide module 30 is positioned in the closed position). To speak more specifically, when the slide module 30 is pushed from the closed position to the opened position, (that is, the upper side of the drawing), the first end 11a of the first arm 11 is driven to move toward the upper side of the drawing. In the meantime, the second 11b of the first arm 11 forcedly drives the second end 12b of the second arm 12 to deflect toward a lateral side of the drawing so as to extend the elastic unit 20 to store energy.

Figure 4:
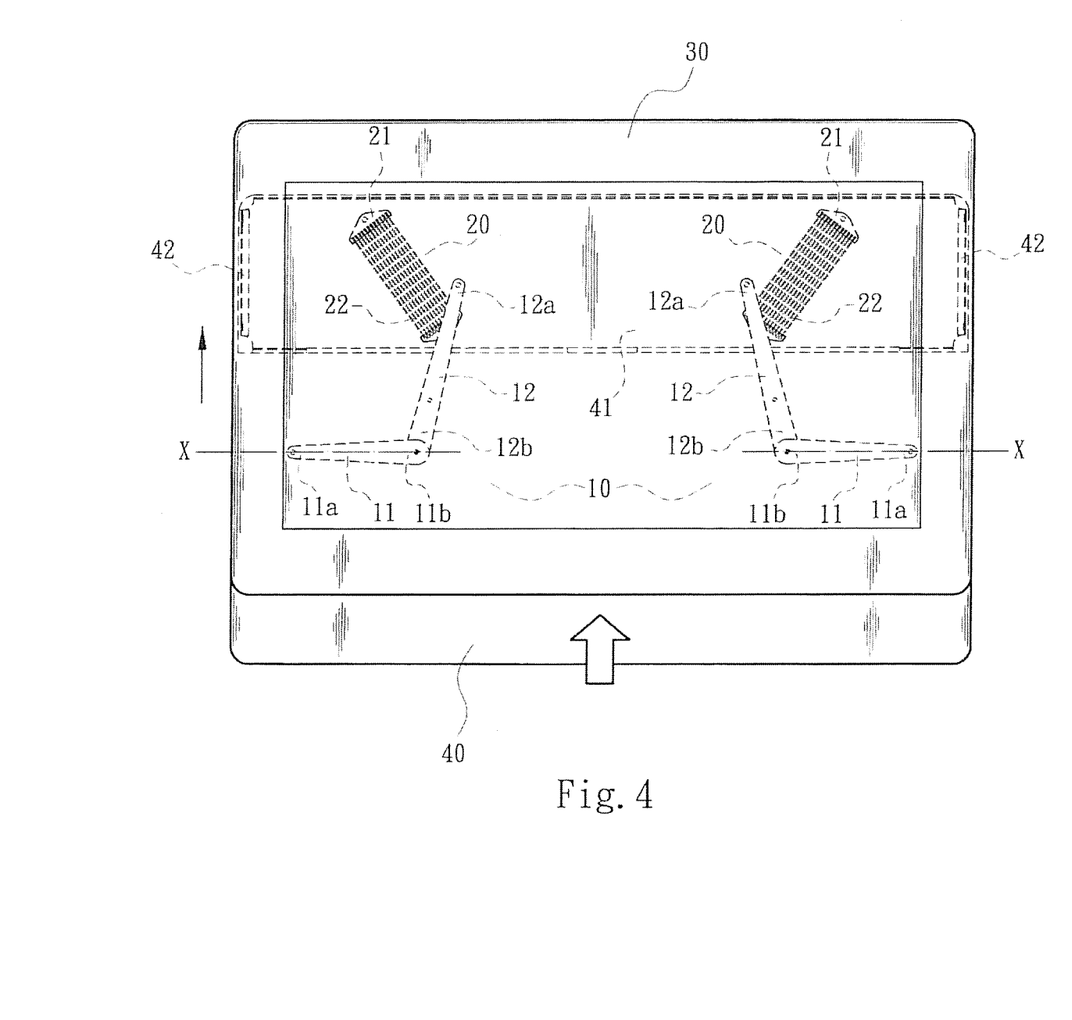
FIG. 4 is a plane view according to FIG. 3, showing that the first arm is moved to the reference axis.
Figure 5:
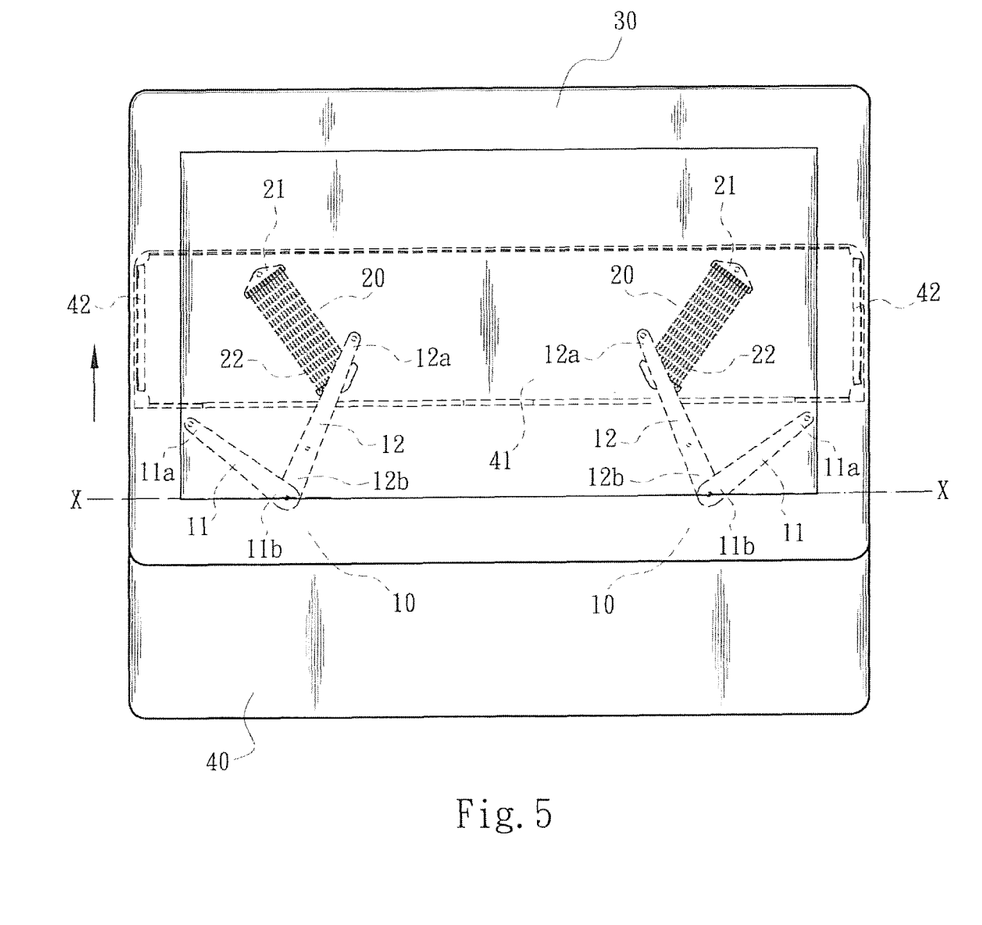
FIG. 5 is a plane view according to FIG. 4, showing that the first arm passes over the reference axis.
Figure 6:
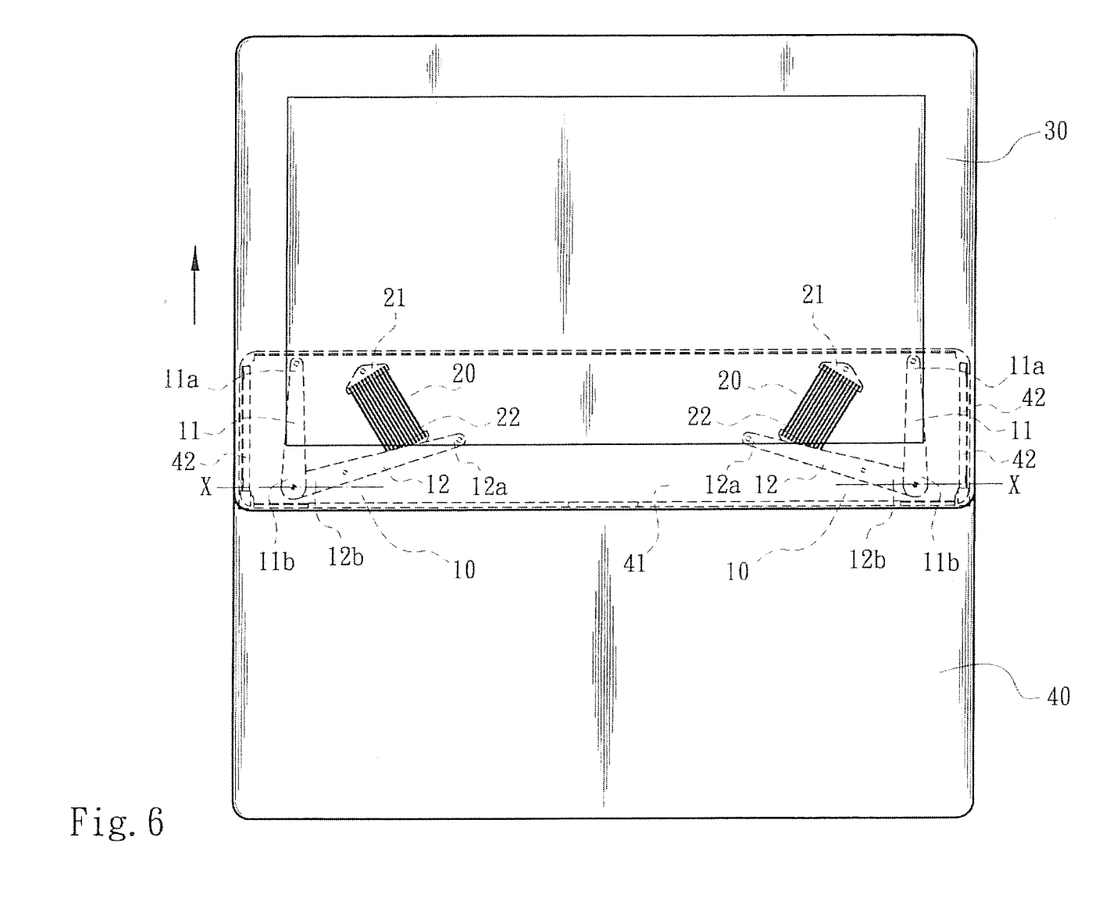
FIG. 6 is a plane view according to FIG. 5, showing that the slide module is positioned in the opened position, also showing the positional relationship between the first and second arms and the elastic units.

Please now refer to FIGS. 4 and 5. After the first end 11a of the first arm 11 moves to the upper side of the drawing and passes over the reference axis χ, the elastic unit 20 releases the stored energy to make the slide module 30 automatically move toward the second position or the upper side of the drawing. In the meantime, the second end 11b of the first arm and the second end 12b of the second arm are forced to move toward the lateral side of the drawing to reach a position as shown in FIG. 6. At this time, the slide module 30 is positioned in the opened position (second position).

It should be noted that in comparison with the conventional device, by means of the slide-aid device of the present invention, after a user pushes the slide module 30 to move through ¼~⅖ the total travel, (that is, a distance shorter than one half the total push travel of the conventional device), the slide module 30 will automatically move toward the opened position. Such arrangement is especially suitable for an electronic apparatus with longer movement travel. Accordingly, the slide cover can be opened with much less strength.

Preferably, the slide-aid device of the present invention includes two symmetrical linkage mechanisms 10 and two symmetrical elastic units 20 mounted on two sides of the slide module 30 and two sides of the fixed apparatus body 40 respectively. Thanks to the synchronous movement of the symmetrical linkage mechanisms 10 and elastic units 20, the slide module 30 can be more stably operated to save strength.

Figure 7:
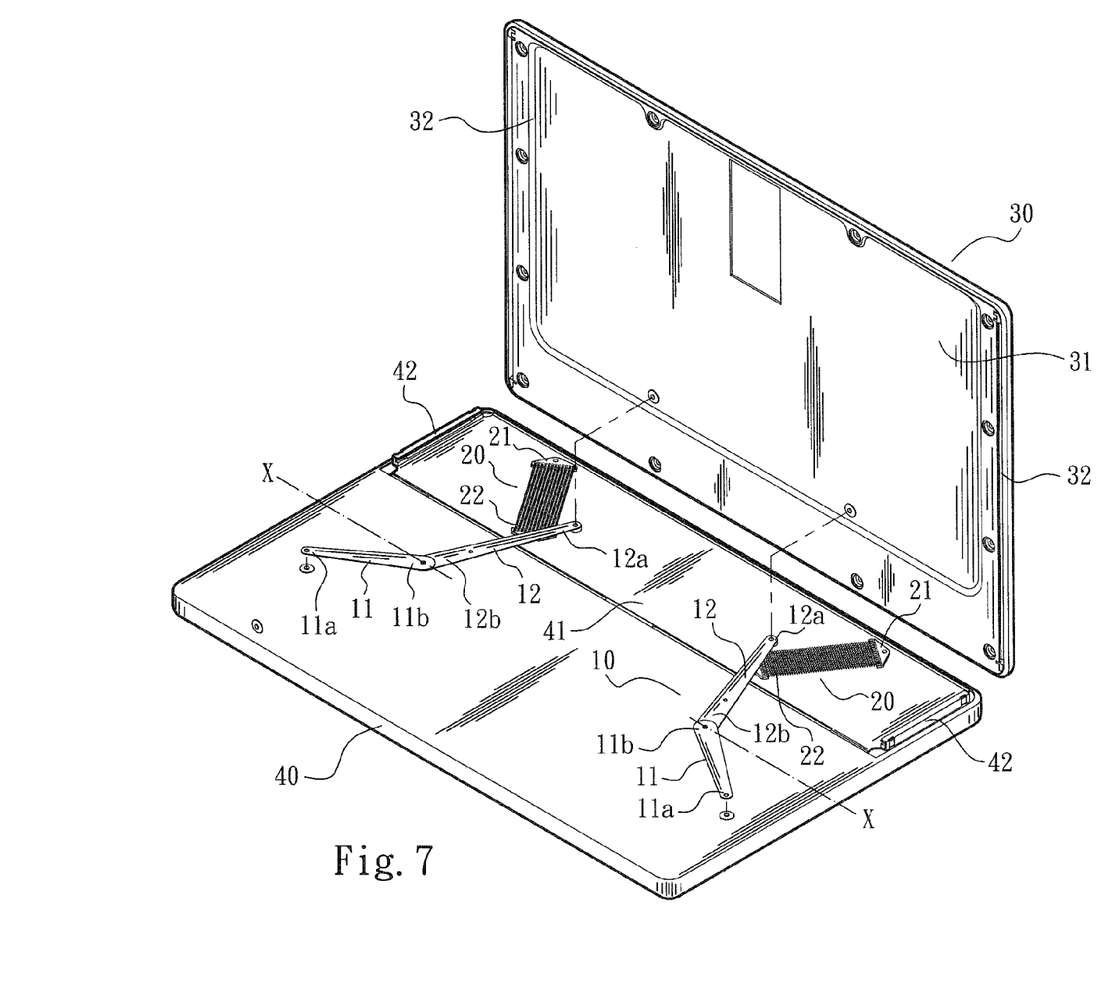
FIG. 7 is a perspective assembled view of a modified embodiment of the present invention.

The first end 11a of the first arm of the linkage mechanism 10 is affixed to the carrier 31 of the slide module 30 (and the second end 11b of the first arm 11 is connected to the second end 12b of the second arm 12). The first end 12a of the second arm 12 is affixed to the substrate 41 of the fixed apparatus body 40. The fixed end 21 of the elastic unit 20 is pivotally connected to the substrate 41 of the fixed apparatus body 40. The connection end 22 of the elastic unit 20 is pivotally connected with the second arm 12 between the first and second ends 12a, 12b thereof. It should be noted that in a modified embodiment, the pivotal connection relationship is changed. For example, the first end 11a of the first arm 11 is affixed to the substrate 41 of the fixed apparatus body 40 (and the second end 11b of the first arm 11 is connected to the second end 12b of the second arm 12). The first end 12a of the second arm 12 is pivotally connected to the carrier 31 of the slide module 30. The fixed end 21 of the elastic unit 20 is affixed to the carrier 31 of the slide module 30 (See FIG. 7). The connection end 22 of the elastic unit 20 is pivotally connected with the second arm 12 between the first and second ends 12a, 12b thereof.

According to the above arrangement, in comparison with the conventional device, the slide-aid device for electronic apparatus of the present invention helps in operating and moving the slide module 30 and has the following advantages:

1. The slide-aid device for electronic apparatus of the present invention is advantageous over the conventional device in that when the slide module 30 is pushed to move from the closed position to the opened position, the first arm 11 synchronously drives the second arm 12 to move. After the first arm 11 passes over the reference axis χ, the elastic unit 20 releases the energy to help in moving the slide module 30 toward the opened position. That is, the linkage mechanism 10 and the elastic unit 20 cooperate with each other to provide an action force to help in moving the slide module 30 toward the opened position. Therefore, when operating the slide module 30, a user, (especially a female, a child or an oldster), can more easily open the slide module 30 with less strength.

2. The slide-aid device for electronic apparatus of the present invention is especially suitable for an electronic system having heavier weight or necessitating longer movement distance. By means of the slide-aid device of the present invention, an operator only needs to push the slide cover or the slide module 30 to move through a shorter travel (about ¼~⅖ the total travel) to make the slide module 30 automatically move toward the opened position. In contrast, in the conventional device, at the initial stage of the push travel of the slide cover module, an operator needs to exert a greater force to push the slide cover module through a longer travel.

The above embodiments are only used to illustrate the present invention, not intended to limit the scope thereof. Many modifications of the above embodiments can be made without departing from the spirit of the present invention.

What is claimed is:

1. A slide-aid device for electronic apparatus, comprising:
a linkage mechanism, and
an elastic unit assembled with the linkage mechanism, the slide-aid device being defined with a reference axis,
wherein the linkage mechanism includes a first arm and a second arm pivotally connected with the first arm, and the elastic unit extends between a fixed end and a connection end, the fixed end of the elastic unit remaining pivotally fixed to a fixed apparatus body and the first and second arms being displaceable relative to the fixed apparatus body, the connection end of the elastic unit being pivotally connected with the second arm, whereby the elastic unit is movable with the second arm.

2. The slide-aid device for electronic apparatus as claimed in claim 1, wherein the elastic unit has the form of an extension spring.

3. The slide-aid device for electronic apparatus as claimed in claim 1, wherein the slide-aid device includes two linkage mechanisms and two elastic units pivotally connected with the two linkage mechanism respectively, the two linkage mechanisms and the two elastic units being symmetrically arranged.

4. The slide-aid device for electronic apparatus as claimed in claim 1, wherein each of the first and second arms has a first end and a second end, the first end of the first arm being pivotally connected to the fixed apparatus body, the second end of the first arm being connected with the second end of the second arm, the first end of the second arm being pivotally connected to a slide module.

5. The slide-aid device for electronic apparatus as claimed in claim 1, wherein each of the first and second arms has a first end and a second end, the first end of the first arm being pivotally connected to a slide module, the second end of the first arm being connected with the second end of the second arm, the first end of the second arm being pivotally connected to the fixed apparatus body.

6. The slide-aid device for electronic apparatus as claimed in claim 5, wherein the slide module and the fixed apparatus body are respectively provided with cooperative rails, whereby the slide module is freely movable on the fixed apparatus body.

7. The slide-aid device for electronic apparatus as claimed in claim 5, the connection end of the elastic unit is pivotally connected with the second arm between the first and second ends thereof.

8. The slide-aid device for electronic apparatus as claimed in claim 5, wherein the connection end of the elastic unit is pivotally connected with the second arm in a position close to the first end of the second arm.

9. The slide-aid device for electronic apparatus as claimed in claim 5, wherein the elastic unit is configured for maximum elastic bias responsive to the first arm angularly aligning with the reference axis, wherein the reference axis horizontally extends with the second end of the first arm serving as a reference point, the reference axis being perpendicular to a direction in which the slide module is moved from a first position to a second position.

10. The slide-aid device for electronic apparatus as claimed in claim 5, wherein the slide-aid device includes two linkage mechanisms and two elastic units pivotally connected with the two linkage mechanism respectively, the two linkage mechanisms and the two elastic units being symmetrically arranged and mounted on two sides of the slide module and two sides of the fixed apparatus body respectively.

* * * * *